United States Patent
Bhatia (10) Patent No.: US 7,333,687 B2
(45) Date of Patent: Feb. 19, 2008

(54) DUAL-FILTER ARCHITECTURE FOR REDUCED DISPERSION

(75) Inventor: Vikram Bhatia, Painted Post, NY (US)

(73) Assignee: Avanex Corporation, Fremont, CA (US)

( * ) Notice: Subject to any disclaimer, the term of this patent is extended or adjusted under 35 U.S.C. 154(b) by 746 days.

(21) Appl. No.: 10/766,680

(22) Filed: Jan. 27, 2004

(65) Prior Publication Data

US 2005/0088768 A1  Apr. 28, 2005

Related U.S. Application Data

(60) Provisional application No. 60/560,756, filed on Oct. 23, 2003.

(51) Int. Cl.
 G02B 6/28 (2006.01)
 G02B 6/26 (2006.01)
 G02B 6/30 (2006.01)

(52) U.S. Cl. .............................. 385/24; 385/15; 385/16; 385/47; 385/49

(58) Field of Classification Search .................. 385/16, 385/24
See application file for complete search history.

(56) References Cited

U.S. PATENT DOCUMENTS

| | | | | |
|---|---|---|---|---|
| 5,629,995 A | * | 5/1997 | Duck et al. | 385/24 |
| 5,786,915 A | * | 7/1998 | Scobey | 398/82 |
| 6,067,178 A | * | 5/2000 | Zheng | 398/1 |
| 6,546,166 B1 | * | 4/2003 | Liu et al. | 385/24 |
| 6,614,569 B2 | * | 9/2003 | Connolly | 398/75 |
| 6,658,172 B1 | * | 12/2003 | Scobey et al. | 385/15 |
| 6,678,476 B1 | * | 1/2004 | Hou | 398/79 |
| 2004/0067014 A1 | * | 4/2004 | Hollars et al. | 385/33 |
| 2005/0078909 A1 | * | 4/2005 | Zhong et al. | 385/24 |

* cited by examiner

*Primary Examiner*—Michelle R. Connelly-Cushwa
(74) *Attorney, Agent, or Firm*—Patterson & Sheridan, LLP

(57) ABSTRACT

Chromatic dispersion of thin-film based mux/demux and add/drop modules can be reduced. Thin-film devices can be arranged in a specific order in the module. Multiple kinds of filters are used to remove "even" and "odd" channels, or other divisions of channels. At least one filter type can be designed for a higher dispersion in transmission but lower dispersion in reflection. At least another filter type can be designed in conjunction with the first filter type such that the sum of the dispersion from the reflection and that from transmission is as low as possible. This ensures that the overall dispersion of the odd and even channels is lower than what one can achieve with one uniform filter.

43 Claims, 6 Drawing Sheets

DUAL-FILTER ARCHITECTURE FOR REDUCED DISPERSION

CROSS-REFERENCE

This application claims benefit of U.S. provisional patent application Ser. No. 60/560,756, filed on Oct. 23, 2003, which is incorporated herein by reference in its entirety and to which application we claim priority under 35 U.S.C. § 119.

BACKGROUND OF THE INVENTION

Thin-film filter (TFF) devices are used for multiplexing/demultiplexing and adding/dropping WDM (Wavelength Division Multiplexed) channels in a multi-wavelength fiberoptic system. The thin-film devices are typically three-port devices that pass a particular wavelength (or range of wavelengths) in transmission depending on the construction of the optical filter element. Thin-film devices can also have fewer or more ports. If the input port contains a plurality of wavelengths, the transmission port passes one wavelength while the reflected port consists of all the remaining signals. By arranging these three-port devices in series one can obtain a module that either separates the multiple optical wavelengths into individual components (this process is termed demultiplexing) or combines individual wavelengths onto one fiber (this process is called multiplexing). Additionally, modules constructed from thin film devices can also be used to selectively add or drop single or multiple channels to dense WDM (DWDM) or coarse WDM (CWDM) systems. Channels can include single and/or multiple wavelengths, discrete and/or continuous.

Designing filters that have lower dispersion in transmission or in reflection is difficult, because for standard filter designs, the dispersion in transmission and the dispersion in reflection are coupled. By designing a filter that has lower dispersion in transmission, one tends to get a higher dispersion in reflection, and vice-versa. Hence, for many standard architectures, one optimal filter design has equal magnitudes of dispersion in transmission and in reflection.

Another technique for reducing dispersion is by introducing a deliberate insertion loss ripple in the transmitted spectrum. Although this reduces dispersion it also trades-off the flatness of the passband (and hence the isolation in reflection). The other approach to lower dispersion (use of filters that have a deliberate insertion loss ripple in the passband) is limited by the trade-off with other optical parameters. For example, higher ripple in the passband degrades the optical signal in particular for cases where this ripple adds up due to propagation through a number of mux/demux or add/drop modules.

SUMMARY

Various apparatuses and methods involve filtering a group of multiplexed channels. The group of multiplexed channels has a first adjacent channel spacing. The group of multiplexed channels includes a first and second subgroup of multiplexed channels. The first subgroup of multiplexed channels has a second adjacent channel spacing greater than the first adjacent channel spacing. The second subgroup of multiplexed channels has a third adjacent channel spacing greater than the first adjacent channel spacing.

Some embodiments include first and second sets of thin film filters. Each thin film filter of the first set has no less than a first transmitted dispersion magnitude and no more than a first reflected dispersion magnitude. The first set splits the first subgroup of multiplexed channels from the group of multiplexed channels. Each thin film filter of the second set has no more than a second transmitted dispersion magnitude and no less than a second reflected dispersion magnitude. The second set splits the second subgroup of multiplexed channels from the group of multiplexed channels. The first transmitted dispersion magnitude exceeds the second transmitted dispersion magnitude.

Some embodiments split the first subgroup of multiplexed channels from the group of multiplexed channels with a first set of thin film filters. Each thin film filter of the first set has no less than a first transmitted dispersion magnitude and no more than a first reflected dispersion magnitude. Some embodiments split the second subgroup of multiplexed channels from the group of multiplexed channels with a second set of thin film filters. Each thin film filter of the second set has no more than a second transmitted dispersion magnitude and no less than a second reflected dispersion magnitude. The first transmitted dispersion magnitude exceeds the second transmitted dispersion magnitude.

Some embodiments split the first subgroup of multiplexed channels from the group of multiplexed channels with a first set of thin film filters. After splitting, each of the first group of multiplexed channels has no more than a first dispersion magnitude. The first dispersion magnitude can be substantially attributable to a first transmitted dispersion magnitude of a first set of thin film filters. Some embodiments split the second subgroup of multiplexed channels from the group of multiplexed channels with a second set of thin film filters. After splitting, each of the second group of multiplexed channels has no more than a second dispersion magnitude. The second dispersion magnitude can be substantially attributable to a first reflected dispersion magnitude of a first set of thin film filters and a second transmitted dispersion magnitude of a second set of thin film filters.

Some embodiments split a group of preinterleaver multiplexed channels into at least a group of multiplexed channels and a second group of multiplexed channels. Some embodiments split the first subgroup of multiplexed channels from the group of multiplexed channels with a first set of thin film filters. After splitting, each of the first subgroup of multiplexed channels has no more than a first dispersion magnitude. The first dispersion magnitude can be substantially attributable to an interleaver dispersion magnitude and a first transmitted dispersion magnitude of a first set of thin film filters. Some embodiments split the second subgroup of multiplexed channels from the group of multiplexed channels with a second set of thin film filters. After splitting, each of the second subgroup of multiplexed channels has no more than a second dispersion magnitude. The second dispersion magnitude can be substantially attributable to an interleaver dispersion magnitude, a first reflected dispersion magnitude of a first set of thin film filters, and a second transmitted dispersion magnitude of a second set of thin film filters.

Some embodiments include first and second sets thin film filters. The first set of thin film filters split the first subgroup of multiplexed channels from the group of multiplexed channels. The second set of thin film filters split the second subgroup of multiplexed channels from the group of multiplexed channels. After the first subgroup of multiplexed channels and the second subgroup of multiplexed channels are split from the group of multiplexed channels, a first dispersion magnitude of the first subgroup of multiplexed channels is substantially equal to a second dispersion magnitude of the second subgroup of multiplexed channels.

Some embodiments split a first subgroup of multiplexed channels from the group of multiplexed channels with a first set of thin film filters. Some embodiments split the second subgroup of multiplexed channels from the group of multiplexed channels with a second set of thin film filters. After the first subgroup of multiplexed channels and the second subgroup of multiplexed channels are split from the group of multiplexed channels, a first dispersion magnitude of the first subgroup of multiplexed channels is substantially equal to a second dispersion magnitude of the second subgroup of multiplexed channels.

DETAILED DESCRIPTION

Figure 1:
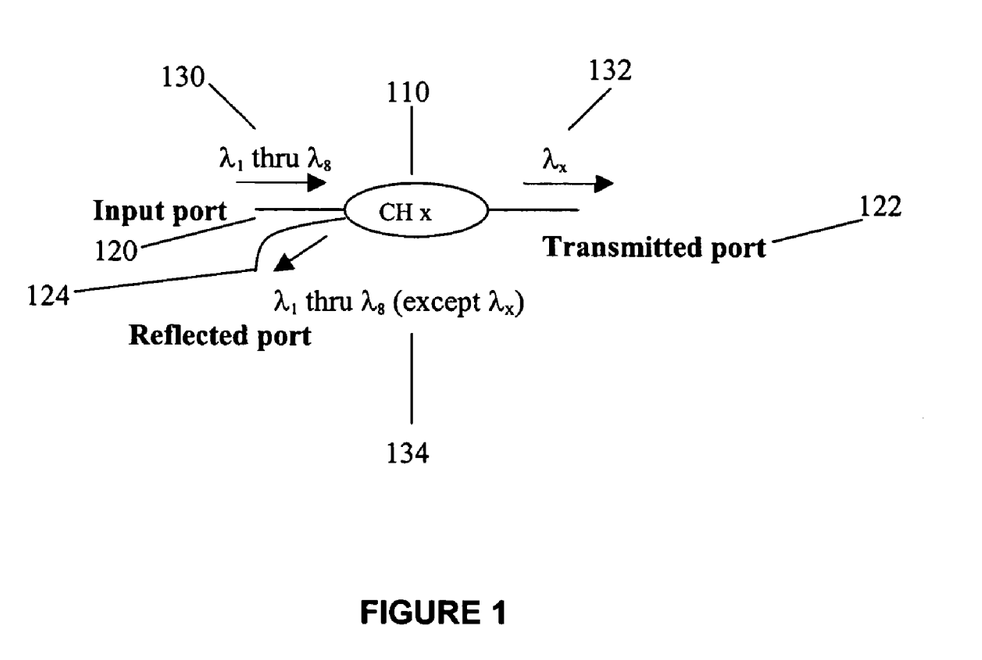
FIG. 1 shows an example of a thin-film filter-based three port device.

In FIG. 1, an example of a thin film filter 110 is shown. The thin film filter includes an input port 120, a transmitted port 122, and a reflected port 124. The input port 120 receives multiple channels 130. The transmitted port 122 removes a single channel 132. The other channels 134 appear at the reflected port 124.

Thin film filters suffer from chromatic dispersion (CD) in transmitted and reflected paths. The CD in an optical signal typically has a deleterious effect of expanding the pulse in time domain and hence resulting in increased inter-symbol interference (ISI). This degrades the capability to detect the signal at the receiver and hence optical modules for multiplexing or demultiplexing are typically designed to lower the overall dispersion for each of the WDM channels. For example, in many optical architectures for a multiple channel demux module, the filters are arranged in order such that the channels are demuxed from the lowest to highest wavelength or from the highest to lowest wavelength.

Figure 2:
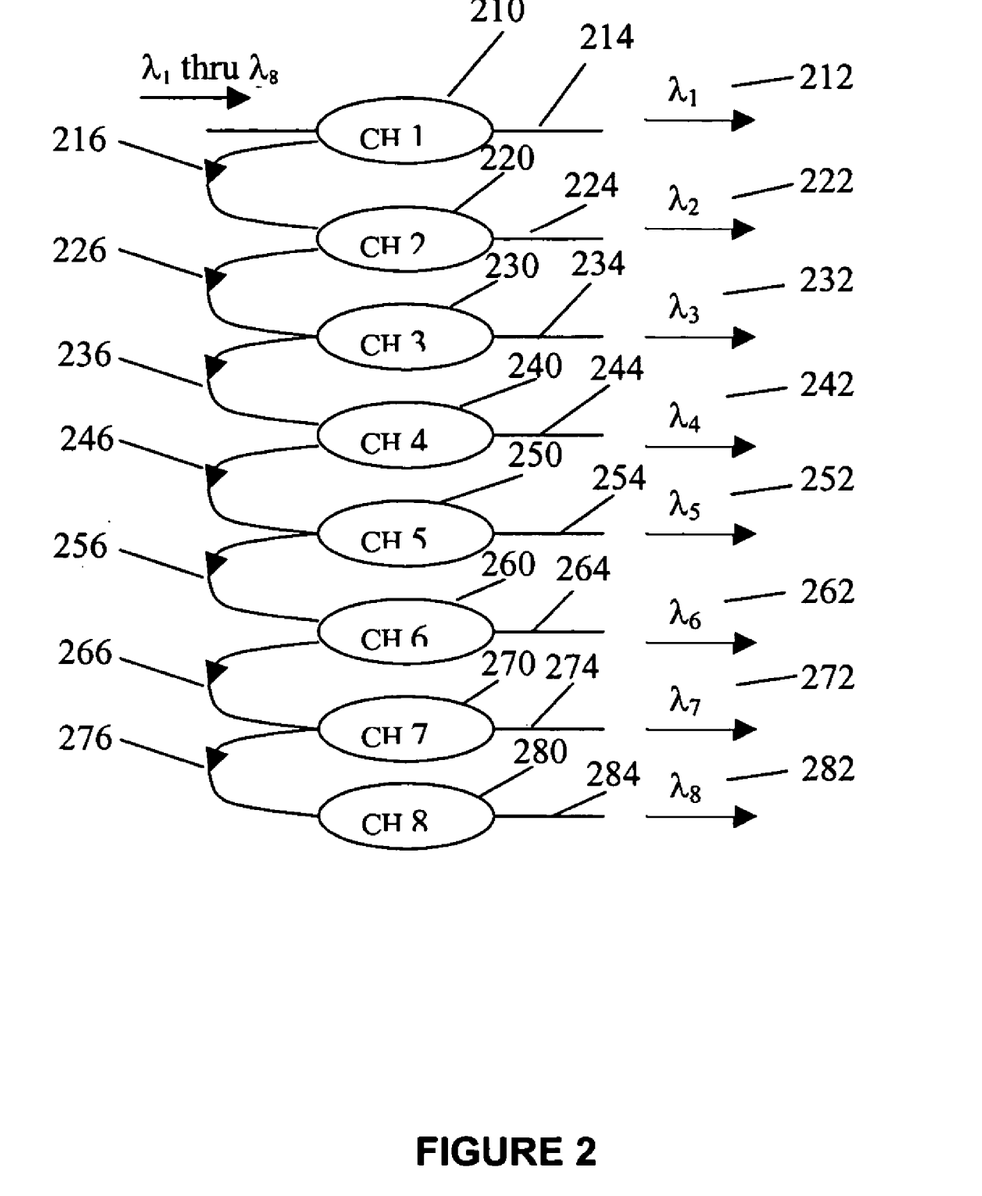
FIG. 2 is an example of an architecture for demuxing eight channels.

In FIG. 2, an example of an architecture for demuxing eight channels is shown. Thin film devices 210, 220, 230, 240, 250, 260, 270, and 280 are serially connected. The reflected port of thin film device 210 and the input port of thin film device 220 are connected at 216. The reflected port of thin film device 220 and the input port of thin film device 230 are connected at 226. The reflected port of thin film device 230 and the input port of thin film device 240 are connected at 236. The reflected port of thin film device 240 and the input port of thin film device 250 are connected at 246. The reflected port of thin film device 250 and the input port of thin film device 260 are connected at 256. The reflected port of thin film device 260 and the input port of thin film device 270 are connected at 266. The reflected port of thin film device 270 and the input port of thin film device 280 are connected at 276.

The transmitted port 214 of thin film filter 210 removes the channel 212. The transmitted port 224 of thin film filter 220 removes the channel 222. The transmitted port 234 of thin film filter 230 removes the channel 232. The transmitted port 244 of thin film filter 240 removes the channel 242. The transmitted port 254 of thin film filter 250 removes the channel 252. The transmitted port 264 of thin film filter 260 removes the channel 262. The transmitted port 274 of thin film filter 270 removes the channel 272. The transmitted port 284 of thin film filter 280 removes the channel 282.

In the architecture shown in FIG. 2, eight channels are demuxed. Other embodiments demux more or fewer channels. The channels can be 100 GHz channels or wider or narrower channels. The thin film devices can be arranged from the shortest to longest wavelength, or from longest to shortest wavelength. The filters typically have the same design. In such a configuration the worst-case dispersion for a channel is the sum of the transmitted and reflected dispersion of the filter.

TABLE 1

|  | Transmitted dispersion over ±17 GHz | Reflected dispersion over ±17 GHz | Sum of transmitted and reflected dispersion |
| --- | --- | --- | --- |
| Design 1 | ±8.3 ps/nm | ±18 ps/nm | ±26.3 ps/nm |
| Design 2 | ±10.8 ps/nm | ±14.3 ps/nm | ±25.1 ps/nm |
| Design 3 | ±13.8 ps/nm | ±11.8 ps/nm | ±25.6 ps/nm |
| Design 4 | ±17.6 ps/nm | ±9.9 ps/nm | ±27.5 ps/nm |

Table 1 shows worst-case transmitted and reflected dispersion for four different filter designs. The difference from one design to the other arises from the variation of the index contrast between the high and low index alternating layers of the filter. All filters designs have five cavities. Other filter designs can have another number of cavities, such as 1, 2, 3, 4, or 6 or more.

One of the ways to lower the dispersion of filters would be to reduce the dispersion either transmission or in reflection. Table 1 shows the trade-off between the transmitted and reflected dispersion for filter designs using five cavities. The difference from one design to the other arises from the variation of the index contrast between the high and low index alternating layers of the filter. Designs in between the ones listed can also be achieved easily. The dispersion numbers are worst-case values in the ±17 GHz passband. As is evident the transmission dispersion increases from Design 1 to Design 4 while the reflected dispersion goes down.

The lowest sum of transmission and reflected dispersion is ±25.1 ps/nm for Design 2. If one uses a standard architecture the first channel will only see the transmitted dispersion which for Design 2 is ±10.8 ps/nm. The remaining channels will have the reflected dispersion from the adjacent channel added and will result in an overall dispersion of ±25.1 ps/nm (sum of transmitted and reflected dispersion). In an architecture where the devices are arranged from lowest to highest wavelengths, the added reflected dispersions will only be negative. Hence, the overall dispersion for the other channels will be −25.1 ps/nm to +10.8 ps/nm, but the worst-case dispersion magnitude in the passband is 25.1 ps/nm. This worst-case dispersion magnitude will still be 25.1 ps/nm even if the devices are arranged from the highest to lowest wavelengths. Even by optimizing the design between the Designs 2 and 3 listed in Table 1, the overall sum of the transmitted and reflected dispersion will still be around ±25 ps/nm.

Also since the first channel has a lower dispersion than the other seven channels this leads to a different ISI penalty for that channel. This analysis ignores the dispersion in reflection from the device that corresponds to the non-adjacent channel. This approximation is valid since the reflected dispersion is essentially zero for the non-adjacent channel.

Figure 3:
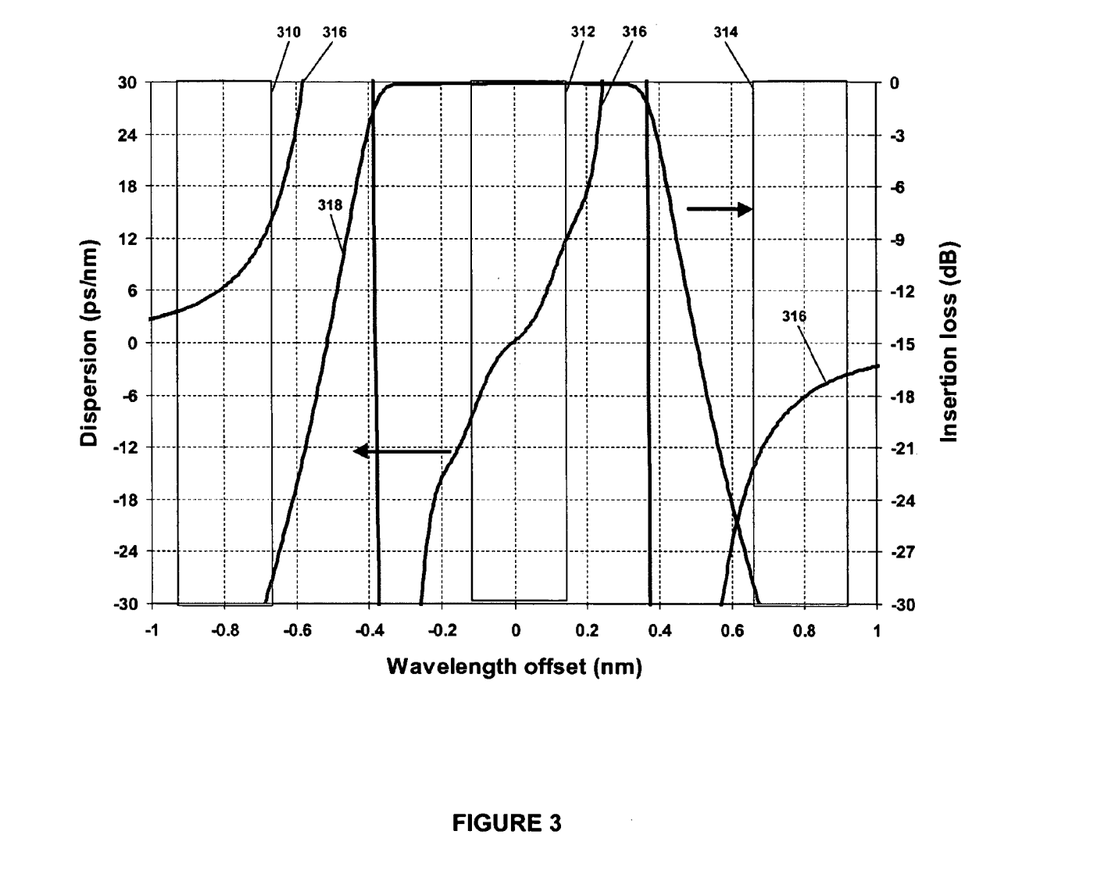
FIG. 3 shows a graph of dispersion and insertion loss variation for a thin film filter.

FIG. 3 shows a graph of dispersion and insertion loss variation for a thin film filter, in this example a 100 GHz filter. Dispersion corresponds to the left axis and insertion loss corresponds to the right axis. Design 3 from Table 1 is characterized.

The vertical rectangular boxes 310, 312, and 314 represent the ±17 GHz (±0.136 nm) passband for the transmitted channel (312 is centered at zero wavelength offset) and the adjacent reflected channels (310 and 314 are centered at ±0.8 nm). The dispersion in the transmission band is shown within each such passband of ±17 GHz. The variation of dispersion in transmission 316 is negative to positive across the passband 312, being a minimum at the lowest edge of the passband, nominally zero in the middle of the passband, and highest at the upper edge of the passband. The variation of dispersion in reflection 316 is completely positive in the passband 310 on the shorter wavelength side. The variation of dispersion in reflection 316 is completely negative in the passband 314 on the longer wavelength side. The worst case dispersion in transmission is ±10.8 ps/nm while that in reflection is ±14.3 ps/nm. Insertion loss 318 is also shown.

The typical passband requirement for many 100 GHz devices is ±10 GHz to ±14 GHz. Packaging of the filters into devices requires an extra margin of a few GHz to take care of over temperature operation and other packaging-related effects. In some cases, the device passband is ±10 GHz while the extra margin is ±7 GHz. The transmission and reflection parameters hence are considered over a total passband of ±17 GHz at the filter level. In other embodiments, other total passbands, device passbands, and/or extra margins apply.

For one design, the worst-case dispersion in transmission is ±10.8 ps/nm and ±14.3 ps/nm in reflection. For the first channel to be dropped, there is a single transmission through the first device; hence the worst-case dispersion for this channel is ±10.8 ps/nm. For the second channel, not only is there a transmission through the second device, but also a reflection off the first one. Hence this channel accumulates dispersion in transmission and in reflection.

The overall dispersion for the subsequent channels is a sum of the transmission and reflection, which for this design is ±25.1 ps/nm. The dispersion for these subsequent channels can be non-symmetrical about the channel center wavelength. The magnitude of the positive and negative worst-case dispersion values is a function of the order of concatenation of the devices—highest to lowest wavelength and lowest to highest wavelength. The dispersion magnitude is used as a figure of merit rather than the polarity of the dispersion in the operation of the system.

Even if the second channel does not follow immediately after the first channel in the chain (but is later in the chain) it will still accumulate the reflected dispersion from the first device. So with the given filter design and any arrangement of the channels, the same worst-case dispersion magnitude results. If a single filter design is used for all devices, there will be at least one channel in the chain that will have the worst-case dispersion, which is the sum of the transmitted and reflected dispersion of the filter. The challenge is to get the lowest possible dispersion for all channels.

Many embodiments reduce the chromatic dispersion of thin-film based mux/demux and add/drop modules. The thin-film devices are arranged in a specific order in the module. This architecture first uses devices spaced by twice the input channel spacing of the channels. The remaining devices are placed subsequent to this to demux the other channels. For example, to demux an eight channel (numbered 1 through 8) 100 GHz system this technique would first demux all so called "even" channels (2,4,6.and 8). Once these channels are removed the remaining channels ("odd"—1,3,5 and 7) are then removed.

Two different kinds of filters are used to remove the even and odd channels. The even channel filters are designed for a higher dispersion in transmission but lower dispersion in reflection. The filters for the odd channels are designed such that the sum of the dispersion from the even channels (in reflection) and that from the odd channels (in transmission) is as low as possible. This ensures that the overall dispersion of the odd and even channels is lower than what one can achieve with the "standard" architecture. In the example considered here the modified architecture with dual-filer approach leads to a reduction of 30% in the worst-case dispersion magnitude compared with the standard architecture using a single filter.

The advantage of many embodiments is that the chromatic dispersion of the module it is lowered without impacting other optical parameters. Also, standard thin-film filters can be used, although specially designed filters (such as the ones with insertion loss ripple in the passband) can also be employed to further lower the dispersion. Also, this technique tends to provide the same worst-case dispersion magnitude for all channels of the module.

Although this dispersion-reduction method calls for the use of two different filter designs, the filter designs can differ very slightly. When thin-film filters are manufactured, they are done on a "plate" basis with each wavelength being made separately. Since half the wavelengths can be made of one design and the other half of a second design, there can be little impact on manufacturing efficiency, compared to the case where all wavelengths have the same filter design.

Figure 4:
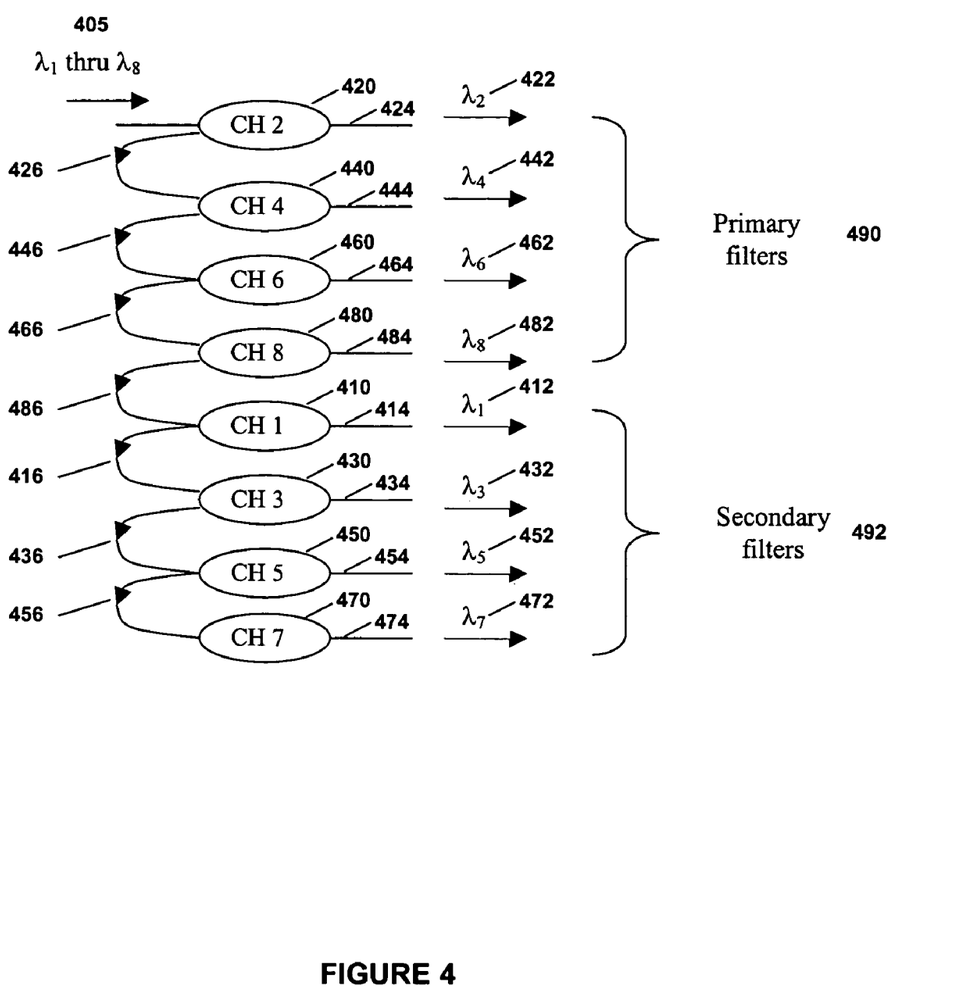
FIG. 4 shows an example architecture for demuxing eight channels with primary and secondary filters.

In FIG. 4, an example of an architecture for demuxing eight channels is shown. Although 100 GHz channels are discussed, other embodiments use other types of channels. Thin film devices 420, 440, 460, 480, 410, 430, 450, and 470 are serially connected. The "even" channels are removed using the primary filters of thin film devices 420, 440, 460, and 480. The odd channels are removed subsequently using the secondary filters of thin film devices 410, 430, 450, and 470. The primary and secondary filters have different designs.

The reflected port of thin film device 420 and the input port of thin film device 440 are connected at 426. The reflected port of thin film device 440 and the input port of thin film device 460 are connected at 446. The reflected port of thin film device 460 and the input port of thin film device 480 are connected at 466. The reflected port of thin film device 480 and the input port of thin film device 410 are connected at 486. The reflected port of thin film device 410 and the input port of thin film device 430 are connected at 416. The reflected port of thin film device 430 and the input port of thin film device 450 are connected at 436. The reflected port of thin film device 450 and the input port of thin film device 470 are connected at 456.

The transmitted port 424 of thin film filter 420 removes the channel 422. The transmitted port 444 of thin film filter 440 removes the channel 442. The transmitted port 464 of thin film filter 460 removes the channel 462. The transmitted port 484 of thin film filter 480 removes the channel 482. The transmitted port 414 of thin film filter 410 removes the channel 412. The transmitted port 434 of thin film filter 430 removes the channel 432. The transmitted port 454 of thin film filter 450 removes the channel 452. The transmitted port 474 of thin film filter 470 removes the channel 472.

The "even" channels are first separated using the first filter design, the primary filter. Since these channels are spaced by twice the input channel separation, the reflected dispersion from the filters earlier in the chain has minimal impact. Hence the whole dispersion margin for that channel can be allocated to the transmitted dispersion of the primary filter. The primary filter can be designed to have a higher transmitted dispersion. If Design 4 from Table 1 is used for the primary filter, the "even" channels have a dispersion of ±17.6 ps/nm, which is the transmission dispersion of Design 4. Although channels after first transmitted channel have the impact of the reflected dispersion from the nonadjacent channel, this channel is 200 GHz away, which permits this effect to be neglected for practical purposes.

The "odd" channels that remain after the removal of the "even" channels are spaced by 200 GHz. These channels are then separated using the second filter design, the secondary filter. These channels have two contributions to their overall chromatic dispersion—from the primary filters in reflection and from the secondary filters in transmission. A design for the primary filter that has a low dispersion in reflection was chosen (Design 4, ±9.9 ps/nm).

For the secondary filter, a design is chosen that meets all other optical parameters (such as bandwidths, isolation, etc.) while at the same time minimizing the transmitted dispersion. Of the four designs listed in Table 1, if Design 1 for the secondary filter yields the best results. Design 1 has a dispersion of ±8.3 ps/nm and ±18 ps/nm in reflection. The dispersion in reflection for the Secondary filter is irrelevant, although the value over the non-adjacent channel should be minimal.

For channel 422 the worst-case dispersion then becomes ±17.2 ps/nm (±8.3 ps/nm from the secondary filter in transmission and ±9.9 ps/nm from the primary filter in reflection. For channel 432 the dispersion in reflection from the two primary filters on either side tends to offset each other slightly, resulting in a lower contribution from the primary filters. The lowers the overall dispersion of channel 432 (and channels 452 and 472) slightly from ±17.2 ps/nm but often not by a significant amount. This can be adjusted by using slightly different designs for the primary and secondary filters and might even result in lower overall dispersion.

Using two filters (primary and secondary) and separating the demuxing of the "even" and "odd" channels the worst-case dispersion can be reduced to ±17.6 ps/nm. This compares very favorably with the ±25.1 ps/nm worst-case dispersion one gets using the architecture where a single filter (e.g., Design 2) was used. This 30% reduction in dispersion is very beneficial for optical systems using thin-film-based mux/demux systems.

Also, the difference in the worst-case dispersion for the channels ("odd" as well as "even") here is less than ±1 ps/nm providing similar ISI penalty for all the channels. For the standard configuration the difference in worst-case dispersion between the eight channels is almost as high as ±10.8 ps/nm. The consistency in the dispersion magnitude across all the channels is another advantage of the dual-filter technique.

The dispersion can be improved even further by choosing better designs for primary and secondary filters. Also, if insertion loss ripple in the passband is not a concern, this two-filter configuration can be extended to devices made from specially designed filters that sacrifice a ripple for lower dispersion. That would potentially lead to even further reduction in the worst-case dispersion magnitude.

The "odd" channels can be demuxed first, following which the "even" channels can be separated. In this case the primary filter can used for the odd channels and the secondary filter for the even channels. Also, the order of the filters can be reversed (from longest to shortest wavelength) for both odd and even channels without impacting the dispersion magnitude. This configuration can be extended to any channel spacing with systems that have three of more channels that need to be muxed, demuxed, added, or dropped.

Although the disadvantage of this technique is that it requires two filters compared with a single filter for the standard architecture, the designer knows which channels require the Primary design and which require the Secondary design. The division is by channels and hence by the wavelength. Since, in any case, each wavelength (in the above case the number is eight) has to be fabricated separately it does not matter too much if it is a Primary filter or a Secondary filter since the two designs are very close. Hence filters for all the wavelengths can be manufactured easily by tweaking the index contrast slightly between the even channels (four in number) and odd channels (also four in number).

Figure 5:
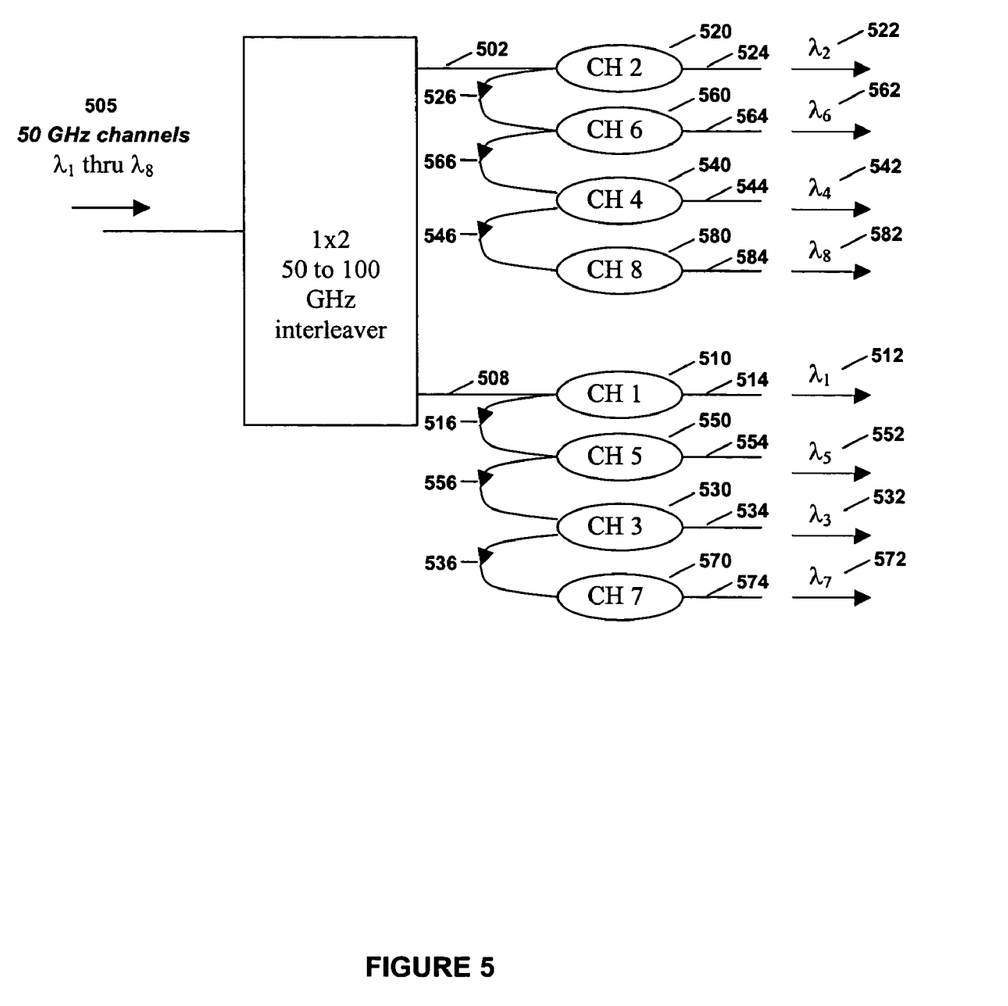
FIG. 5 shows an architecture for demuxing eight channels which includes an interleaver.

In FIG. 5, an example of an architecture for demuxing eight channels which includes an interleaver is shown. Although 50 GHz channel are discussed, other embodiments use other types of channels. The interleaver receives channels 505 and splits them into even channels for thin film filters 520, 540, 560, and 580, and into odd channels for thin film filters 510, 550, 530, and 570.

The even channels are handled by thin film devices 520, 560, 540, and 580, which are serially connected. The reflected port of thin film device 520 and the input port of thin film device 560 are connected at 526. The reflected port of thin film device 560 and the input port of thin film device 540 are connected at 566. The reflected port of thin film device 540 and the input port of thin film device 580 are connected at 546. The transmitted port 524 of thin film filter 520 removes the channel 522. The transmitted port 564 of thin film filter 560 removes the channel 562. The transmitted port 544 of thin film filter 540 removes the channel 542. The transmitted port 584 of thin film filter 580 removes the channel 582.

The odd channels are handled by thin film devices 510, 550, 530, and 570, which are serially connected. The reflected port of thin film device 510 and the input port of thin film device 550 are connected at 516. The reflected port of thin film device 550 and the input port of thin film device 530 are connected at 556. The reflected port of thin film device 530 and the input port of thin film device 570 are connected at 536.

The transmitted port 514 of thin film filter 510 removes the channel 512. The transmitted port 554 of thin film filter 550 removes the channel 552. The transmitted port 534 of thin film filter 530 removes the channel 532. The transmitted port 574 of thin film filter 570 removes the channel 572. The primary filters are used for channels 522, 562, 512, and 552. The secondary filters are used for channels 544, 584, 534, and 574.

Interleavers are devices such as three port devices that in a demux configuration are used to separate odd and even channels. The input port contains a certain channel spacing, say 50 GHz, while the two output ports will contain the odd and even channels separately. The use of the interleaver enables one to double the channel spacing at the output ports and subsequently employ 100 GHz filters for demuxing. The 100 GHz devices are lower in cost and also provide a much lower chromatic dispersion than 50 GHz filters. The technique to use the dual-filter approach with an interleaver is illustrated in FIG. 5. In one arm of the interleaver the non-adjacent even channels (channels 522 and 562) are separated first using primary filters while the secondary filters are used for the other even channels (channels 542 and 582). In the second arm of the interleaver the odd channels are separated similarly (primary filters for channels 512 and 552 and secondary filters for channels 532 and 572). This configuration is a 50 GHz low-dispersion demux. The dispersion of the interleaver adds to the overall dispersion of the thin-film filters.

Figure 6:
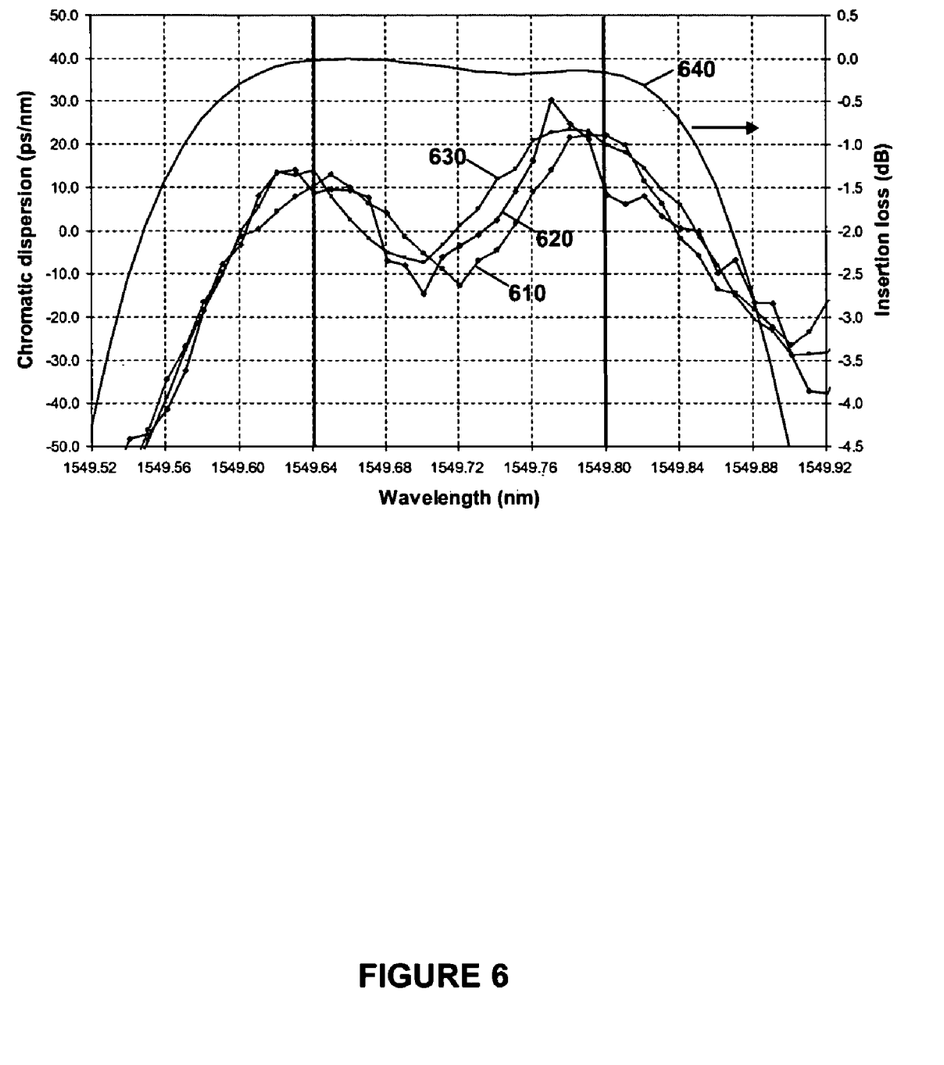
FIG. 6 shows a channel with worst-case dispersion for the architecture depicted in FIG. 5.

FIG. 6 shows the channel with the worst-case dispersion for the demux module employing the architecture depicted in FIG. 5. Insertion loss corresponds to the rights axis and is shown by curve 640. The three dispersion plots 610, 620, and 630 correspond to the left axis and show the measurements at three different operating temperatures (−5° C., 25° C. and 70° C.). The worst case dispersion is ±30 ps/nm for this particular channel, highlighting the effectiveness of the dual-filter technique. The lowest value of the worst-case dispersion for the eight channels is ±20 ps/nm. The interleaver in this case had a channel-dependent dispersion of ±5 ps/nm to ±15 ps/nm. The data from this 50 GHz module shows the effectiveness of the dual-filter approach in not only reducing the worst-case dispersion but also in making the dispersion consistent from one channel to the other. The dispersion variation of ±10 ps/nm from the best-case to the worst-case channels can be attributed to the channel-to-channel dispersion variation of the interleaver.

What is claimed is:

1. An optical apparatus, the optical apparatus filtering a plurality of multiplexed channels having a first adjacent channel spacing, the plurality of multiplexed channels including at least a first subplurality of multiplexed channels and a second subplurality of multiplexed channels, the first subplurality of multiplexed channels having a second adjacent channel spacing greater than the first adjacent channel spacing, the second subplurality of multiplexed channels having a third adjacent channel spacing greater than the first adjacent channel spacing, the optical apparatus comprising:
    a first set of one or more thin film filters, each thin film filter of the first set of one or more thin film filters having no less than a first transmitted dispersion magnitude and having no more than a first reflected dispersion magnitude, wherein the first set of one or more thin film filters split the first subplurality of multiplexed channels from the plurality of multiplexed channels; and
    a second set of one or more thin film filters, each thin film filter of the second set of one or more thin film filters having no more than a second transmitted dispersion magnitude and having no less than a second reflected dispersion magnitude, wherein the second set of one or more thin film filters split the second subplurality of multiplexed channels from the plurality of multiplexed channels,
    wherein the first transmitted dispersion magnitude exceeds the second transmitted dispersion magnitude.

2. The optical apparatus of claim 1, wherein the first transmitted dispersion magnitude, the first reflected dispersion magnitude, the second transmitted dispersion magnitude, and the second reflected dispersion magnitude are worst case magnitudes associated with one or more passbands.

3. The optical apparatus of claim 1, wherein the second adjacent channel spacing and the third adjacent channel spacing are equal.

4. The optical apparatus of claim 1, wherein the second adjacent channel spacing and the third adjacent channel spacing are different.

5. The optical apparatus of claim 1, wherein the first set of one or more thin film filters is arranged before the second set of one or more thin film filters.

6. The optical apparatus of claim 1, further comprising:
    an interleaver splitting a plurality of preinterleaver multiplexed channels into at least the first plurality of multiplexed channels and a second plurality of multiplexed channels.

7. The optical apparatus of claim 6, wherein the plurality of preinterleaver multiplexed channels has a fourth adjacent channel spacing less than the first adjacent channel spacing.

8. A method of filtering a plurality of multiplexed channels having a first adjacent channel spacing, the plurality of multiplexed channels including at least a first subplurality of multiplexed channels and a second subplurality of multiplexed channels, the first subplurality of multiplexed channels having a second adjacent channel spacing greater than the first adjacent channel spacing, the second subplurality of multiplexed channels having a third adjacent channel spacing greater than the first adjacent channel spacing, the method comprising:
    splitting the first subplurality of multiplexed channels from the plurality of multiplexed channels with a first set of one or more thin film filters, each thin film filter of the first set of one or more thin film filters having no less than a first transmitted dispersion magnitude and having no more than a first reflected dispersion magnitude; and
    splitting the second subplurality of multiplexed channels from the plurality of multiplexed channels with a second set of one or more thin film filters, each thin film filter of the second set of one or more thin film filters having no more than a second transmitted dispersion magnitude and having no less than a second reflected dispersion magnitude,
    wherein the first transmitted dispersion magnitude exceeds the second transmitted dispersion magnitude.

9. The method of claim 8, wherein the first transmitted dispersion magnitude, the first reflected dispersion magnitude, the second transmitted dispersion magnitude, and the second reflected dispersion magnitude are worst case magnitudes associated with one or more passbands.

10. The method of claim 8, wherein the second adjacent channel spacing and the third adjacent channel spacing are equal.

11. The method of claim 8, wherein the second adjacent channel spacing and the third adjacent channel spacing are different.

12. The method of claim 8, wherein splitting the first subplurality of multiplexed channels from the plurality of multiplexed channels precedes splitting the second subplurality of multiplexed channels from the plurality of multiplexed channels.

13. The method of claim 8, further comprising:
    splitting a plurality of preinterleaver multiplexed channels into at least the plurality of multiplexed channels and a second plurality of multiplexed channels.

14. The method of claim 13, wherein the plurality of preinterleaver multiplexed channels has a fourth adjacent channel spacing less than the first adjacent channel spacing.

15. A method of filtering a plurality of multiplexed channels having a first adjacent channel spacing, the plurality of multiplexed channels including at least a first subplurality of multiplexed channels and a second subplurality of multiplexed channels, the first subplurality of multiplexed channels having a second adjacent channel spacing greater than the first adjacent channel spacing, the second subplurality of multiplexed channels having a third adjacent channel spacing greater than the first adjacent channel spacing, the method comprising:

splitting the first subplurality of multiplexed channels from the plurality of multiplexed channels with the first set of one or more thin film filters, such that after splitting, each of the first subplurality of multiplexed channels has no more than a first dispersion magnitude, the first dispersion magnitude being substantially attributable to a first transmitted dispersion magnitude of a first set of one or more thin film filters; and splitting the second subplurality of multiplexed channels from the plurality of multiplexed channels with the second set of one or more thin film filters, such that after splitting, each of the second subplurality of multiplexed channels has no more than a second dispersion magnitude, the second dispersion magnitude being substantially attributable to a first reflected dispersion magnitude of the first set of one or more thin film filters and a second transmitted dispersion magnitude of a second set of one or more thin film filters, wherein the first transmitted dispersion magnitude exceeds the second transmitted dispersion magnitude.

16. The method of claim 15, wherein the first dispersion magnitude, the second dispersion magnitude, the first transmitted dispersion magnitude, the first reflected dispersion magnitude, and the second transmitted dispersion magnitude are worst case magnitudes associated with one or more passbands.

17. The method of claim 15, wherein the second adjacent channel spacing and the third adjacent channel spacing are equal.

18. The method of claim 15, wherein the second adjacent channel spacing and the third adjacent channel spacing are different.

19. The method of claim 15, wherein splitting the first subplurality of multiplexed channels from the plurality of multiplexed channels precedes splitting the second subplurality of multiplexed channels from the plurality of multiplexed channels.

20. A method of filtering a plurality of multiplexed channels having a first adjacent channel spacing, the plurality of multiplexed channels including at least a first subplurality of multiplexed channels and a second subplurality of multiplexed channels, the first subplurality of multiplexed channels having a second adjacent channel spacing greater than the first adjacent channel spacing, the second subplurality of multiplexed channels having a third adjacent channel spacing greater than the first adjacent channel spacing, the method comprising:

splitting a plurality of preinterleaver multiplexed channels into at least the plurality of multiplexed channels and a second plurality of multiplexed channels;

splitting the first subplurality of multiplexed channels from the plurality of multiplexed channels with a first set of one or more thin film filters, such that after splitting, each of the first subplurality of multiplexed channels has a first dispersion magnitude, the first dispersion magnitude being substantially attributable to an interleaver dispersion magnitude and a first transmitted dispersion magnitude of the first set of one or more thin film filters; and splitting the second subplurality of multiplexed channels from the plurality of multiplexed channels with a second set of one or more thin film filters, such that after splitting, each of the second subplurality of multiplexed channels has a second dispersion magnitude, the second dispersion magnitude being substantially attributable to the interleaver dispersion magnitude, a first reflected dispersion magnitude of the first set of one or more thin film filters, and a second transmitted dispersion magnitude of the second set of one or more thin film filters.

21. The method of claim 20, wherein the interleaver dispersion magnitude, the first dispersion magnitude, the second dispersion magnitude, the first transmitted dispersion magnitude, the first reflected dispersion magnitude, and the second transmitted dispersion magnitude are worst case magnitudes associated with one or more passbands.

22. The method of claim 20, wherein the second adjacent channel spacing and the third adjacent channel spacing are equal.

23. The method of claim 20, wherein the second adjacent channel spacing and the third adjacent channel spacing are different.

24. The method of claim 20, wherein splitting the first subplurality of multiplexed channels from the plurality of multiplexed channels precedes splitting the second subplurality of multiplexed channels from the plurality of multiplexed channels.

25. The method of claim 20, wherein the plurality of preinterleaver multiplexed channels has a fourth adjacent channel spacing less than the first adjacent channel spacing.

26. An optical apparatus, the optical apparatus filtering a plurality of multiplexed channels having a first adjacent channel spacing, the plurality of multiplexed channels including at least a first subplurality of multiplexed channels and a second subplurality of multiplexed channels, the first subplurality of multiplexed channels having a second adjacent channel spacing greater than the first adjacent channel spacing, the second subplurality of multiplexed channels having a third adjacent channel spacing greater than the first adjacent channel spacing, the optical apparatus comprising:

a first set of one or more thin film filters, wherein the first set of one or more thin film filters split the first subplurality of multiplexed channels from the plurality of multiplexed channels; and a second set of one or more thin film filters, wherein the second set of one or more thin film filters split the second subplurality of multiplexed channels from the plurality of multiplexed channels, wherein after the first subplurality of multiplexed channels and the second subplurality of multiplexed channels are split from the plurality of multiplexed channels, a first dispersion magnitude of the first subplurality of multiplexed channels is substantially equal to a second dispersion magnitude of the second subplurality of multiplexed channels.

27. The optical apparatus of claim 26, wherein the first dispersion magnitude and the second dispersion magnitude are worst case magnitudes associated with one or more passbands.

28. The optical apparatus of claim 26, wherein the second adjacent channel spacing and the third adjacent channel spacing are equal.

29. The optical apparatus of claim 26, wherein the second adjacent channel spacing and the third adjacent channel spacing are different.

30. The optical apparatus of claim 26, wherein the first set of one or more thin film filters is arranged before the second set of one or more thin film filters.

31. The optical apparatus of claim 26, wherein the first dispersion magnitude of the first subplurality of multiplexed channels is substantially equal to the second dispersion magnitude of the second subplurality of multiplexed channels, such that the first dispersion magnitude and the second dispersion magnitude are within 1 ps/nm.

32. The optical apparatus of claim 26, wherein the first dispersion magnitude of the first subplurality of multiplexed channels is substantially equal to the second dispersion magnitude of the second subplurality of multiplexed channels, such that the first dispersion magnitude and the second dispersion magnitude are within 10 ps/nm.

33. The optical apparatus of claim 26, further comprising:
an interleaver splitting a plurality of preinterleaver multiplexed channels into at least the plurality of multiplexed channels and a second plurality of multiplexed channels.

34. The optical apparatus of claim 33, wherein the plurality of preinterleaver multiplexed channels has a fourth adjacent channel spacing less than the first adjacent channel spacing.

35. A method of filtering a plurality of multiplexed channels having a first adjacent channel spacing, the plurality of multiplexed channels including at least a first subplurality of multiplexed channels and a second subplurality of multiplexed channels, the first subplurality of multiplexed channels having a second adjacent channel spacing greater than the first adjacent channel spacing, the second subplurality of multiplexed channels having a third adjacent channel spacing greater than the first adjacent channel spacing, the method comprising:
splitting the first subplurality of multiplexed channels from the plurality of multiplexed channels with a first set of one or more thin film filters;
splitting the second subplurality of multiplexed channels from the plurality of multiplexed channels with a second set of one or more thin film filters,
wherein after the first subplurality of multiplexed channels and the second subplurality of multiplexed channels are split from the plurality of multiplexed channels, a first dispersion magnitude of the first subplurality of multiplexed channels is substantially equal to a second dispersion magnitude of the second subplurality of multiplexed channels.

36. The method of claim 35, wherein the first dispersion magnitude and the second dispersion magnitude are worst case magnitudes associated with one or more passbands.

37. The method of claim 35, wherein the second adjacent channel spacing and the third adjacent channel spacing are equal.

38. The method of claim 35, wherein the second adjacent channel spacing and the third adjacent channel spacing are different.

39. The method of claim 35 wherein splitting the first subplurality of multiplexed channels from the plurality of multiplexed channels precedes splitting the second subplurality of multiplexed channels from the plurality of multiplexed channels.

40. The method of claim 35, wherein the first dispersion magnitude of the first subplurality of multiplexed channels is substantially equal to the second dispersion magnitude of the second subplurality of multiplexed channels, such that the first dispersion magnitude and the second dispersion magnitude are within 1 ps/nm.

41. The method of claim 35, wherein the first dispersion magnitude of the first subplurality of multiplexed channels is substantially equal to the second dispersion magnitude of the second subplurality of multiplexed channels, such that the first dispersion magnitude and the second dispersion magnitude are within 10 ps/nm.

42. The method of claim 35, further comprising:
splitting a plurality of preinterleaver multiplexed channels into at least the plurality of multiplexed channels and a second plurality of multiplexed channels.

43. The method of claim 42, wherein the plurality of preinterleaver multiplexed channels has a fourth adjacent channel spacing less than the first adjacent channel spacing.

* * * * *